United States Patent
Huang

(10) Patent No.: US 7,199,867 B2
(45) Date of Patent: Apr. 3, 2007

(54) ANTI-INTERFERENCE SPEED DETECTION METHODS AND DETECTORS THEREOF

(75) Inventor: Dong Huang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 250 days.

(21) Appl. No.: 11/086,062

(22) Filed: Mar. 22, 2005

(65) Prior Publication Data

US 2006/0132756 A1    Jun. 22, 2006

(30) Foreign Application Priority Data

Dec. 16, 2004    (TW) .............................. 93139129 A

(51) Int. Cl.
*G01P 3/40* (2006.01)

(52) U.S. Cl. .................... 356/28; 356/5.01; 701/93; 382/104

(58) Field of Classification Search .................... 356/28
See application file for complete search history.

(56) References Cited

U.S. PATENT DOCUMENTS 5,359,404 A * 10/1994 Dunne ...................... 356/5.06
6,466,307 B2   10/2002 Chien et al. ............... 356/5.03

* cited by examiner

*Primary Examiner*—Thomas H. Tarcza
*Assistant Examiner*—Tim Brainard
(74) *Attorney, Agent, or Firm*—Thomas, Kayden, Horstemeyer & Risley

(57) ABSTRACT

A speed detection method is implemented in a speed detector comprising a range finder. First, a specific number of distance measurement samples of an object are acquired during a period of time utilizing the range finder. The distance measurement samples are converted to M versions of the distance measurement samples respectively based on M velocities, wherein M is a positive integer. Each version of the distance measurement samples comprises reflected distance measurement laser pulses. Each reflected pulse corresponds to a measured distance and a received pulse order. A version of the distance measurement samples is determined, which comprises a distance range to which the highest number of reflected pulses corresponds. A speed of the object is calculated based on an assumed velocity to which the determined version corresponds.

14 Claims, 7 Drawing Sheets

ANTI-INTERFERENCE SPEED DETECTION METHODS AND DETECTORS THEREOF

BACKGROUND

The invention relates to electronic devices, and in particular, to speed detection methods and devices.

An optical range finder calculates a distance by measuring the time during emitting a laser pulse at an object and receiving the reflected laser pulse. The pulse reaches the object and is reflected back to the range finder. The speed of a moving object can be determined by acquiring two distances thereof at different times and dividing distance difference by the time difference. FIG. 1 is an ideal schematic diagram of laser pulses reflected by a moving object for distance measurement. Assuming the object is measured 200 times, FIG. 1 shows only a portion of distance measurements thereof. The horizontal axis in FIG. 1 represents distance, and the vertical axis represents the orders of reflected laser pulses, i.e. the distance measurements. The orders of reflected pulses have fixed intervals. Each reflected signal corresponds to a distance derived by a distance formula. The speed of the object can be calculated utilizing the reflected pulses distributed in FIG. 1. Reflected pulses may comprise noise due to sunlight or other interference factors. Thus, the actual distribution of reflected signals received might be as shown in FIG. 2 (only a portion is shown). For getting the speed information from FIG. 2, it is necessary to filter the noise therefrom.

U.S. Pat. No. 6,466,307 B2 discloses a signal processing method and device for laser range-finder, wherein the distribution of actual reflected laser pulses directed at an object is stable when noise is randomly distributed, and the actual reflected pulses are accordingly retrieved statistically. A distance measurement by a conventional range finder, however, requires a certain period of time, such as 0.5 seconds, during which the moving object may continuously change locations, causing the distribution of actual reflected pulses to be unstable and thereby disadvantageous to reflected pulse extraction.

Additionally, speed measurement must also be acquired in a short time, such as 0.6 seconds, insufficient for two distance measurements by a typical range finder. Thus, a typical range finder has difficulty in acquiring two measured distances to determine speed.

SUMMARY

Accordingly, anti-interference speed detection methods and detectors thereof are provided.

An exemplary embodiment of a speed detection method is implemented in a speed detector comprising a range finder. First, a specific number of distance measurement samples of an object are acquired during a period of time utilizing the range finder. The distance measurement samples are converted based on velocities of M assumed observers to generate M versions of the distance measurement samples respectively corresponding to the M velocities, wherein M is a positive integer. Each version of the distance measurement samples comprises reflected distance measurement laser pulses. Each reflected pulse corresponds to a measured distance and a received pulse order. A version of the distance measurement samples is determined, which comprises a distance range to which the highest number of reflected pulses corresponds. A speed of the object is calculated based on velocity of a first assumed observer to which the determined version corresponds.

An exemplary embodiment of a speed detector comprises a range finder and a processor coupled thereto. The range finder acquires a specific number of distance measurement samples of an object during a period of time. The processor converts the distance measurement samples based on M assumed velocities to generate M versions of the distance measurement samples respectively corresponding to the M velocities, wherein M is a positive integer. Each version of the distance measurement samples comprises reflected distance measurement laser pulses. Each reflected pulse corresponds to a measured distance and a received pulse order. The processor determines a version of the distance measurement samples comprising a distance range to which the highest number of reflected pulses corresponds. A speed of the object is calculated based on velocities of assumed observers to which the determined version corresponds.

DESCRIPTION OF THE DRAWINGS

The invention can be more fully understood by reading the subsequent detailed description and examples with references made to the accompanying drawings, wherein.

DETAILED DESCRIPTION

Figure 1:
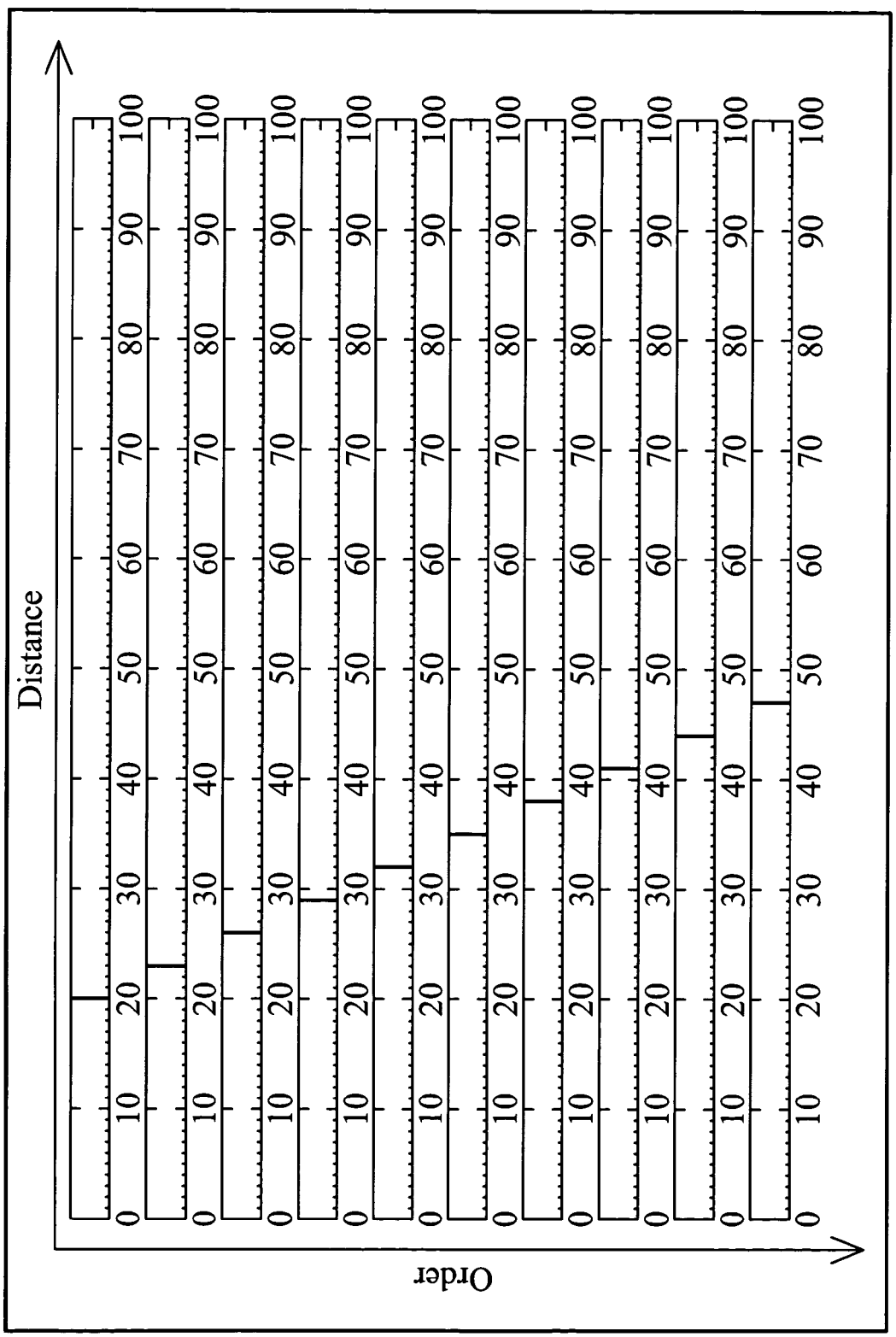
FIG. 1 is an ideal schematic diagram of distance measurement laser pulses reflected by a moving object.
Figure 3:
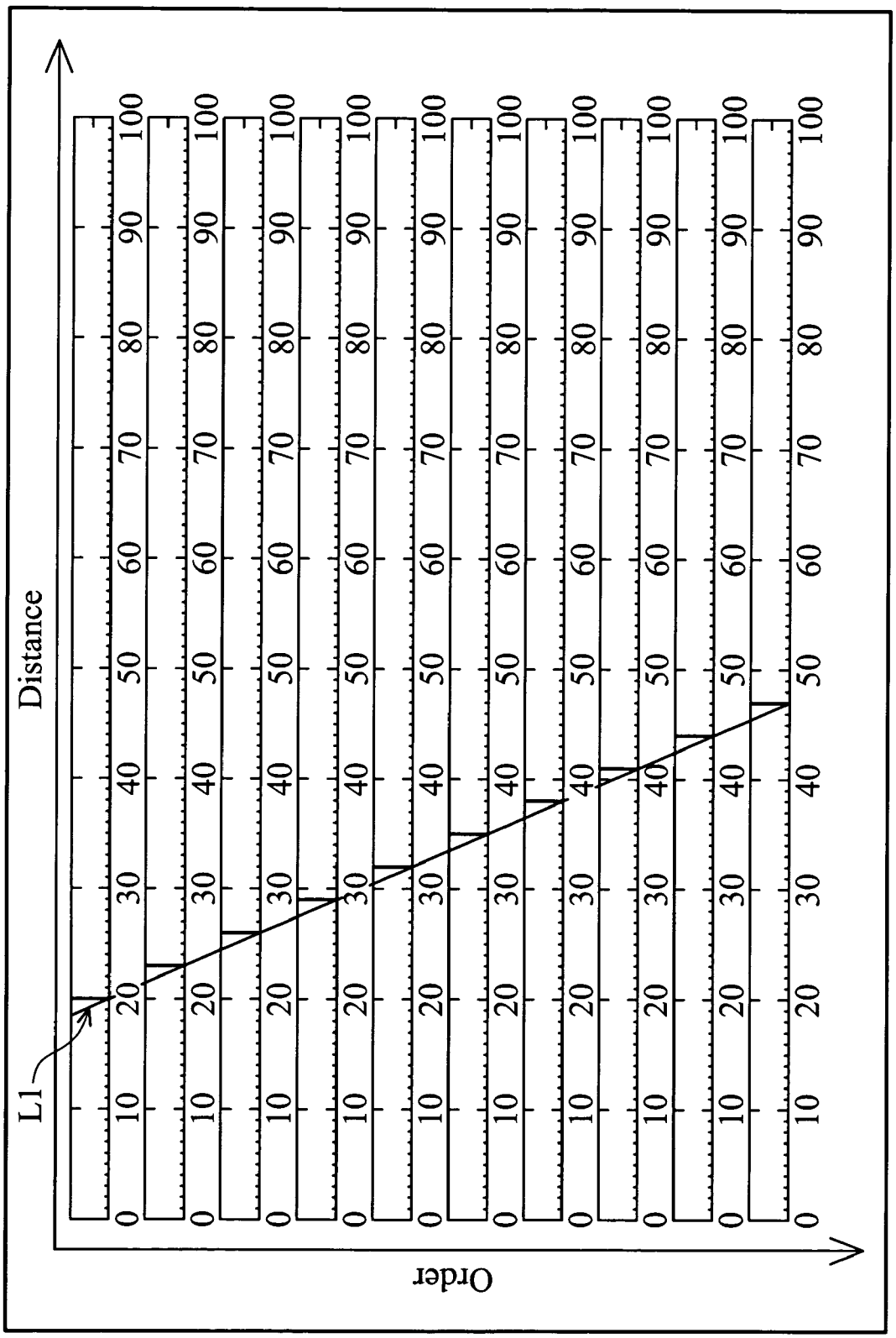
FIG. 3 is a schematic diagram of the reflected pulses in FIG. 1 connected by a line.
Figure 4:
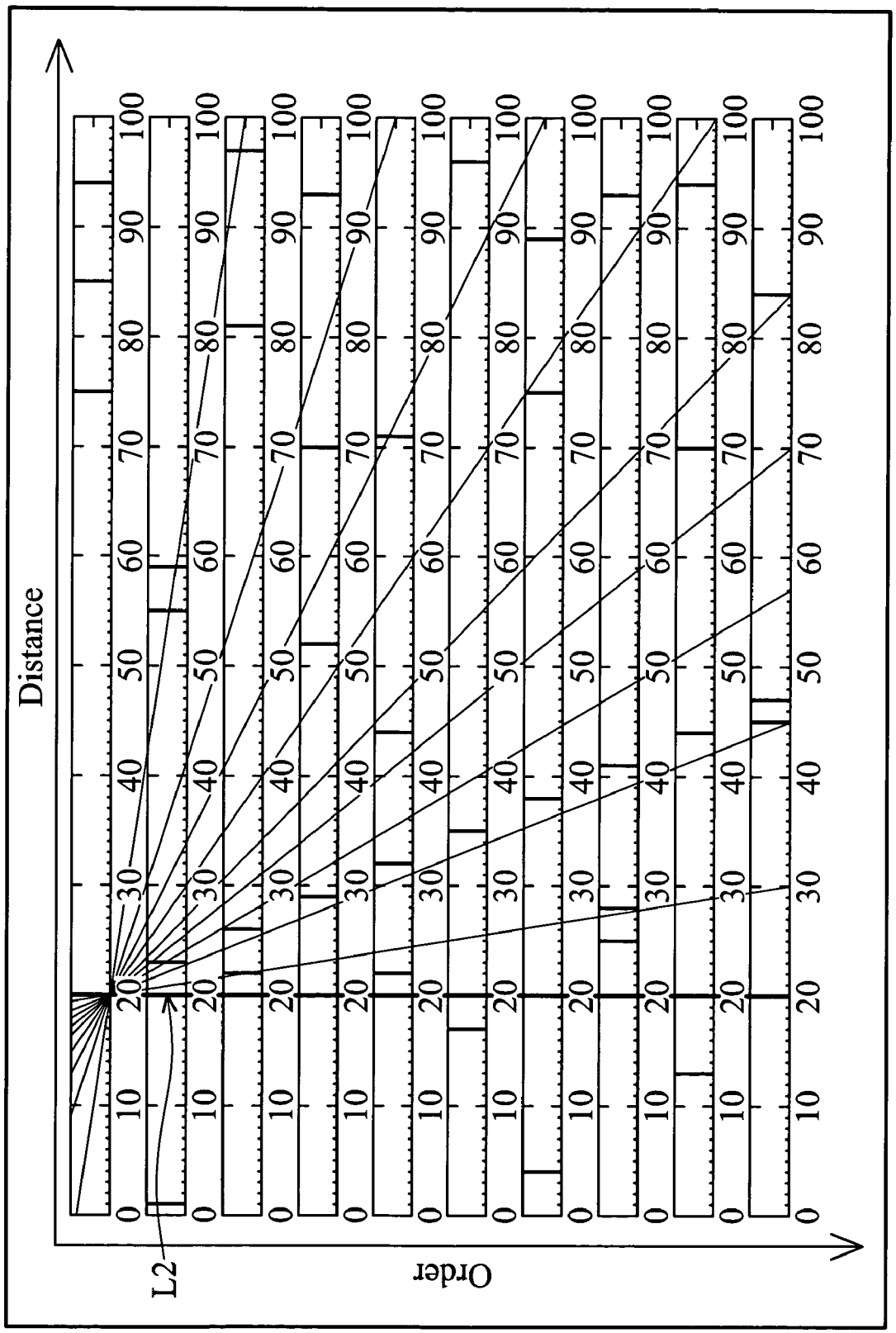
FIG. 4 is a schematic diagram of a plurality of lines converted from the line in FIG. 3.

Ideally, the reflected pulses in FIG. 1 can be connected by a line L1, as shown in FIG. 3. FIG. 3 is assumed to be the result of distance measurement of the object achieved by a stationary range finder. If the distance of the object is measured by range finders moving at different velocities, lines connecting reflected pulses of respective received distance measurement results may have different slopes, as shown in FIG. 4. If a velocity of a range finder is equal to the velocity of the object, all reflected pulses in the distance measurement result of the range finder correspond to an identical distance along a vertical line, such as line L2 in FIG. 4, in which reflected pulses correspond to distance scale 20. The velocity of the range finder having line L2 can be adopted as the velocity of the object, wherein line L2 can be located utilizing the laser range signal processing method disclosed in U.S. Pat. No. 6,466,307 B2.

Anti-interference speed detection methods implemented in speed detectors are provided. U.S. application Ser. No. 11/085426 entitled "Speed detection methods and devices" is incorporated herein. Velocities of assumed range finders are referred as velocities of assumed observers in the following.

First Embodiment

Figure 5:
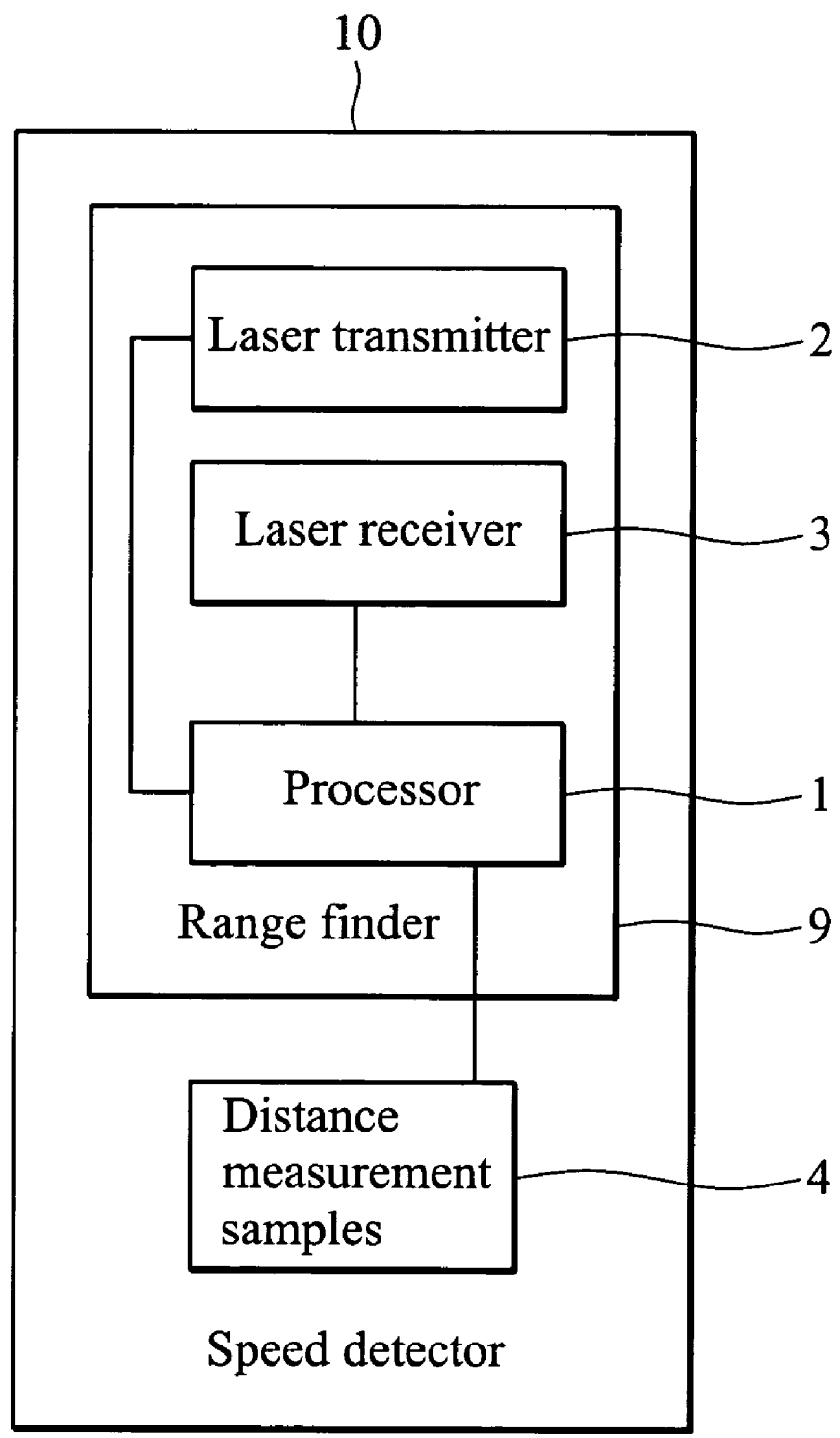
FIG. 5 is a block diagram of configuration of an exemplary embodiment of a speed detector.

As shown in FIG. 5, speed detector 10 comprises range finder 9 and processor 1 coupled with laser transmitter 2 and laser receiver 3. Laser transmitter 2 and laser receiver 3 which respectively emit distance measurement laser pulses and receive reflected distance measurement laser pulses comprising noise.

Figure 2:
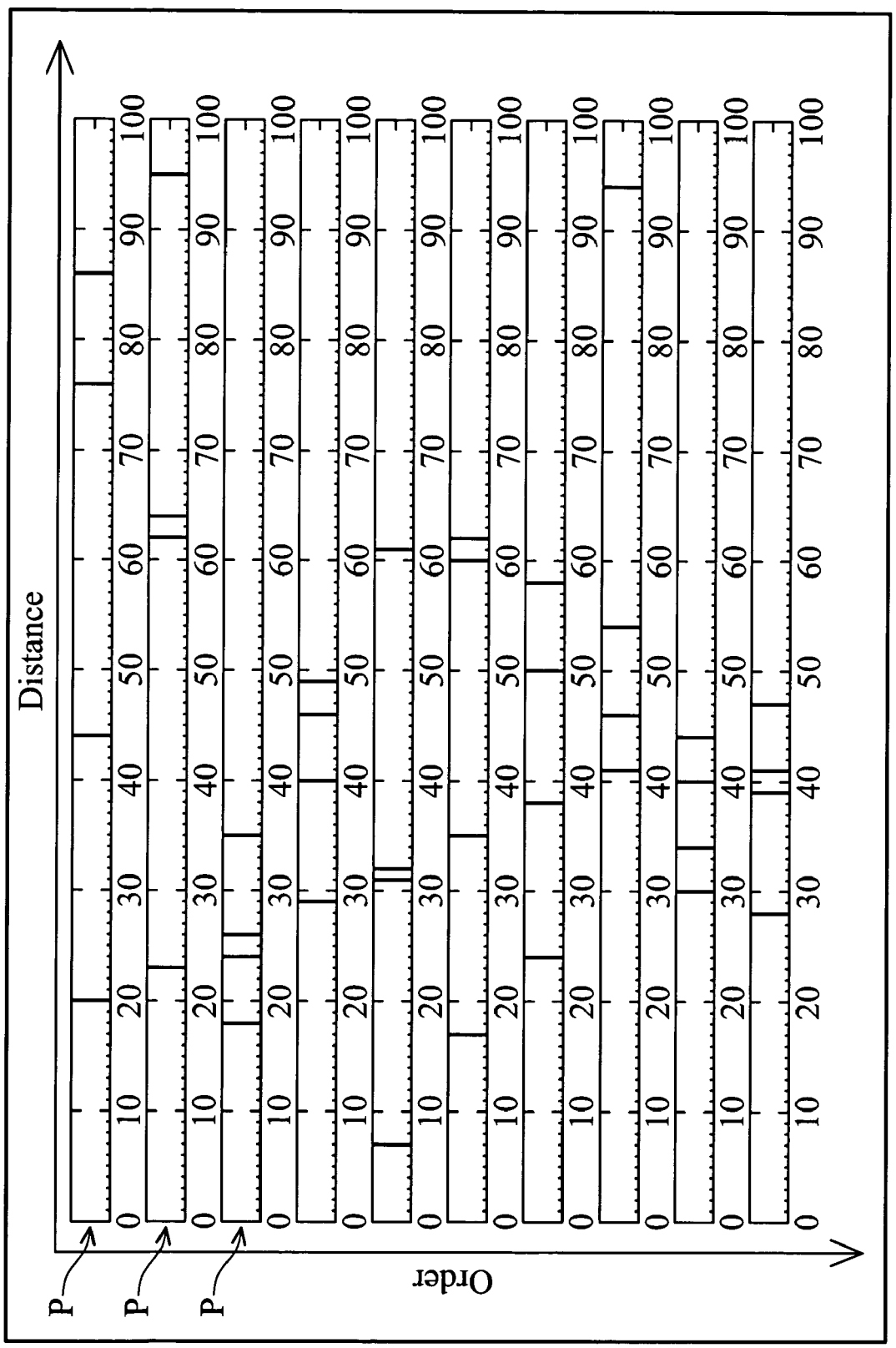
FIG. 2 is a schematic diagram of exemplary distance measurement laser pulses reflected by a moving object.
Figure 6:
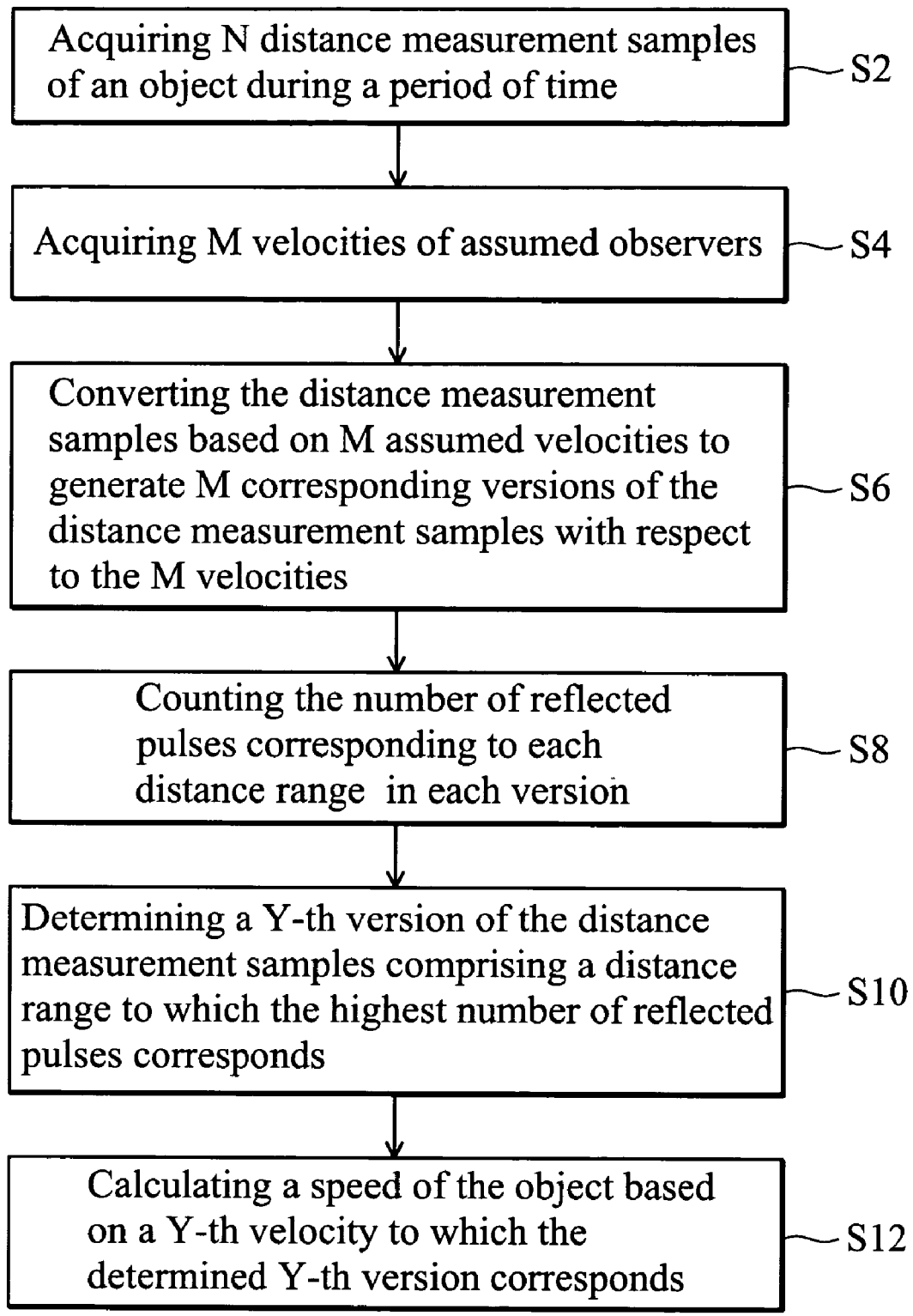
FIG. 6 is a flowchart of a first embodiment of a speed detection method.

FIG. 6 is a flowchart of an exemplary embodiment of a speed detection method. Speed detector 10 acquires distance measurement samples 4, the received data of distance measurement of an object at N times utilizing range finder 9 during a period of time, as partially shown in FIG. 2 (step S2). The N times have an interval ΔT. Range finder 9 measures distance of the object with an original unit of measurement (such as one meter). The duration of time that speed detector 10 calculates the speed of the object is assumed to be restricted to t seconds, and range finder 9 is assumed to be capable of n1 distance measurements per second. The period might be less than or equal to t seconds, and N may be smaller than or equal to n1×t, wherein t is a real number, and N and n1 are positive integers.

The object detected by speed detector 10 may comprise a vehicle or other moving object, the speed of which may be restricted to between a maximum speed Vmax and a minimum speed Vmin dependent on the type of object.

Distance measurement samples 4 are now detailed.

Distance measurement samples 4 comprise N distance measurement samples (such as samples P in FIG. 2), each comprising a sequence of reflected pulses of a distance measurement laser pulse emitted by range finder 9 in a certain received pulse order. Each reflected pulse corresponds to a received pulse order and a distance measured with the original unit of measurement.

Processor 1 acquires M velocities of assumed observers (step S4). M is a positive integer. The M velocities of assumed observers may be predetermined and stored in speed detector 10 or dynamically determined by processor 1. For example, processor 1 determines the M velocities of assumed observers by exhaustion, comprising Vmin, (Vmin+Vr), (Vmin+2×Vr), . . . (Vmax−Vr), and Vmax. M=⌊(Vmax−Vmin)/Vr⌋+1, wherein Vr is a unit of speed measurement, such as 1 m/sec. Note that the M velocities may be determined by other ways.

Processor 1 converts the distance measurement samples based on velocities of M assumed observers to generate M versions of the distance measurement samples respectively corresponding to the velocities of M assumed observers (step S6). For example, after the distance measurement samples are converted to a second version of the distance measurement samples based on an velocity Vn of an assumed observer, a first reflected signal in the distance measurement samples corresponding to received pulse order Tx and measured distance Dx converted to a second reflected pulse in the second version corresponding to received pulse order Tx and measured distance (Dx−Vn*(ΔT+Tx), wherein Vmin≦Vn≦Vmax, and ΔT is an interval between two adjacent received pulse orders. Similarly, processor 1 converts each reflected pulse in the distance measurement samples to generate a corresponding pulse thereof in the second version. The M version can be generated from the original distance measurement samples by processor 1 similarly.

For each distance range (such as intervals between scales) in each version, processor 1 calculates the number of reflected pulses corresponding thereto (step S8).

Divisions of the new M distance measurement samples in each version comprise distance ranges. For example, a distance range comprises an interval between two adjacent scales measured with an original unit of measurement of the speed detector.

Next, processor 1 determines a Y-th version of the distance measurement samples comprising a distance range to which the highest number of reflected pulses corresponds (step S10) and calculates a speed of the object based on a velocity of Y-th assumed observers to which the determined Y-th version corresponds (step S12). For example, processor 1 adopts the velocity of Y-th assumed observers as the speed of the object in the calculation.

In step S8, processor 1 may calculate the number of reflected pulses for each distance range in each version. Note that processor 1 may also calculate the number of reflected pulses for a specific distance range in each version, which is determined based on a rough measured distance D1.

Second Embodiment

Figure 7:
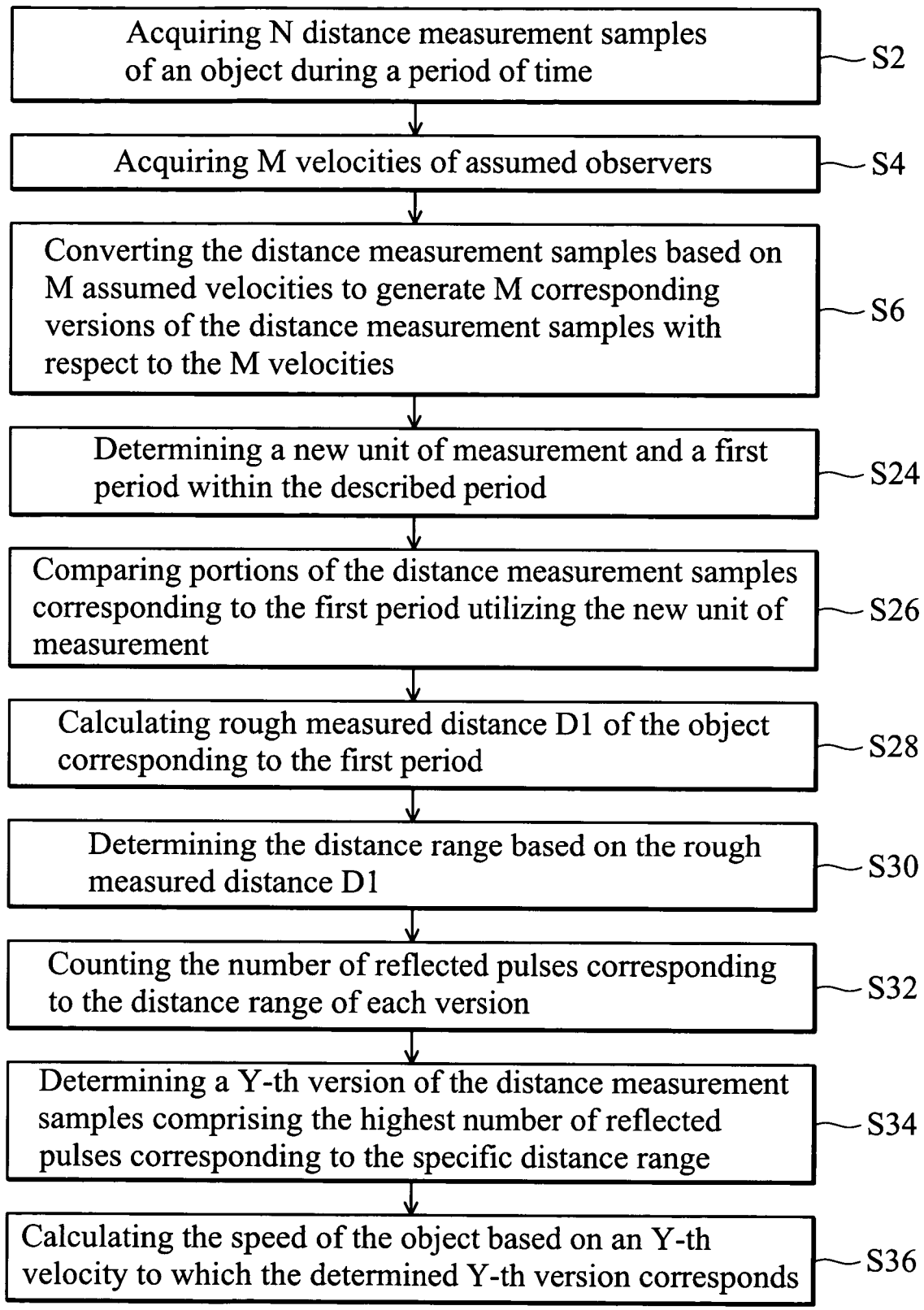
FIG. 7 is a flowchart of a second embodiment of a speed detection method.

Processor 1 may first perform steps S2~S6. Referring to FIG. 7, processor 1 determines and acquires a new unit of measurement (such as 10 meters) and a first period within the described period (step S24), so that an estimated distance of the object moves in the first period is less than the new unit of measurement. The new unit is greater than the original unit. For example, the estimated distance can be derived by respectively multiplying the highest speed Vmax by the first period. The new unit of measurement and the first period can be predetermined and stored in speed detector 10 or dynamically determined by processor 1.

The first period comprises received pulse order Ti~Tj. Ti and Tj are positive integers. Each version of the distance measurement samples comprises reflected distance measurement laser pulses, and each reflected pulse corresponds to a measured distance and a received pulse order.

For example, each reflected pulse is distributed in a planar coordinate system spanned by an order axis and a distance axis, with its corresponding received pulse order as its order-axis coordinate and its corresponding distance as its distance-axis coordinate respectively. Range finder 9 may calculate the corresponding distance of each reflected pulse.

For example, if a reflected pulse corresponds to received pulse order T and distance D, the coordinate thereof can be represented by (T, D), wherein T is the order-axis coordinate thereof, and D is the distance-axis coordinate thereof.

Processor 1 compares portions of distance measurement samples 4 corresponding to the first period utilizing the new unit of measurement (step S26) to calculate rough measured distance D1 of the object corresponding to the first period (step S28).

The first period comprises (Tj−Ti+1) distance measurement samples, each comprising a sequence of reflected pulses of a distance measurement laser pulse emitted by range finder 9.

The DISTANCE D1 is a distance measured with the new unit of measurement (i.e. a scale measured with the new unit of measurement) to which the highest number of reflected pulses within the first period correspond.

For example, if a two dimensional array RawData[DISTANCE] [N] represents distance measurement samples 4, DISTANCE may be the maximum scale measured with the original unit of measurement of speed detector 10. An one-dimensional arrays, Dist1[DIST], represents the results of compared portions of distance measurement samples 4 corresponding to the first period. DIST=⌊(DISTANCE×r)/R⌋, wherein r and R are respectively the original unit and the new unit of measurement. 0~DIST represents the scales measured with the new unit of measurement in speed detector 10. Processor 1 calculates the number of reflected pulses in the (Tj−Ti+1) distance measurement samples, corresponding to the least scale measured with the new unit of measurement, and stores the calculated numbers in Dist1[0]. Processor 1 calculates the number of reflected pulses in the (Tj−Ti+1) distance measurement samples, corresponding to the second scale measured with the new unit of measurement, and stores the calculated numbers in Dist1[1]. Similarly, processor 1 can calculate values of all elements of Dist1[DIST]. Processor 1 acquires Dist1[d1] with maximum value from Dist1[DIST]. The first rough measured distance D1=d1×R/r.

Processor 1 determines the distance range based on the rough measured distance D1 (step S30). For example, processor 1 determines that the distance range comprises a range from (D1−ΔD) to (D1+ΔD), wherein ΔD is an allowable distance offset.

For the determined specific distance range in each version, processor 1 calculates the number of reflected pulses corresponding thereto (step S32). Next, processor 1 determines a Y-th version of the distance measurement samples comprising the highest number of reflected pulses corresponding to the specific distance range (step S34) and calculates the speed of the object based on an Y-th velocity to which the determined Y-th version corresponds (step S36).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed detection method, implemented in a speed detector comprising a range finder, comprising:
   acquiring a specific number of distance measurement samples of an object during a period of time utilizing the range finder;
   converting the distance measurement samples based on velocities of M assumed observers to generate M versions of the distance measurement samples respectively corresponding to the velocities of M assume observers, wherein M is a positive integer, each version of the distance measurement samples comprises reflected distance measurement laser pulses, and each reflected pulse corresponds to a measured distance and a received pulse order;
   determining a version of the distance measurement samples comprising a distance range to which the highest number of reflected pulses corresponds; and
   calculating a speed of the object based on an assumed velocity to which the determined version corresponds.

2. The method as claimed in claim 1, wherein calculation of a speed of the object comprises adopting the assumed velocity as the speed of the object.

3. The method as claimed in claim 1, wherein the distance range comprises an interval between two adjacent scales measured with an original unit of measurement of the speed detector.

4. The method as claimed in claim 1, wherein after the distance measurement samples are converted to a second version of the distance measurement samples based on an velocity Vn of an assumed observer, a first reflected signal in the distance measurement samples corresponding to received pulse order Tx and measured distance Dx is converted to a second reflected pulse in the second version corresponding to received pulse order Tx and measured distance (Dx−Vn×ΔT×Tx), wherein ΔT is an interval between two adjacent received pulse orders.

5. The method as claimed in claim 1, further comprising:
   acquiring a new unit of measurement exceeding movement distances of the object in a first period;
   calculating a rough measured distance D1 corresponding to the locations of the object in the first period by comparing portions of the distance measurement samples corresponding to the first period utilizing the new unit of measurement; and
   determining the distance range based on the rough measured distance D1.

6. The method as claimed in claim 5, wherein the rough measured distance D1 is represented by a scale measured with the new unit of measurement, to which the highest number of reflected pulses in the distance measurement samples within the first period corresponds.

7. The method as claimed in claim 1, further comprising determining the M assumed velocities of the assumed observers based on a maximum velocity, a minimum velocity, and a unit of speed measurement.

8. A speed detector, comprising:
   a range finder acquiring a specific number of distance measurement samples of an object during a period of time;
   a processor coupled to the range finder, converting the distance measurement samples based on velocities of M assumed observers to generate M versions of the distance measurement samples respectively corresponding to the velocities of M assumed observers, wherein M is a positive integer, each version of the distance measurement samples comprises reflected distance measurement laser pulses, each reflected pulse corresponds to a measured distance and a received pulse order, an the processor determines a version of the distance measurement samples comprising a distance range to which the highest number of reflected pulses corresponds and calculates a speed of the object based on an velocity of assumed observer to which the determined version corresponds.

9. The speed detector as claimed in claim 8, wherein the processor adopts the velocity of assumed observer as the speed of the object.

10. The speed detector as claimed in claim 8, wherein the distance range comprises an interval between two adjacent scales measured with an original unit of measurement of the speed detector.

11. The speed detector as claimed in claim 8, wherein after the distance measurement samples are converted to a second version of the distance measurement samples based on an velocity Vn of an assumed observer, a first reflected signal in the distance measurement samples corresponding to received pulse order Tx and measured distance Dx is converted to a second reflected pulse in the second version corresponding to received pulse order Tx and measured distance (Dx−Vn×ΔT×Tx), wherein ΔT is an interval between two adjacent received pulse orders.

12. The speed detector as claimed in claim 8, wherein the processor acquires a new unit of measurement larger than movement distances of the object in a first period, calculates a rough measured distance D1 corresponding to the locations of the object in the first period by comparing portions of the distance measurement samples corresponding to the first period utilizing the new unit of measurement, and determines the distance range based on the rough measured distance D1.

13. The speed detector as claimed in claim 12, wherein the rough measured distance D1 is represented by a scale measured with the new unit of measurement, to which the highest number of reflected pulses in the distance measurement samples within the first period corresponds.

14. The speed detector as claimed in claim 8, wherein the processor determines the M assumed velocities of the assumed observers based on a maximum velocity, a minimum velocity, and a unit of speed measurement.

* * * * *